(12) United States Patent
Klotz et al.

(10) Patent No.: US 7,837,137 B2
(45) Date of Patent: Nov. 23, 2010

(54) HOLDER WITH SHAFT ELEMENT FOR A DEVICE FOR MINCING FOOD

(75) Inventors: Markus Klotz, Hainau (DE); Benjamin Schramm, Holzheim (DE); Christian Gross, Netphen (DE); Stephan Gerster, Bad Breisig (DE)

(73) Assignee: Leifheit AG, Nassau/Lahn (DE)

( * ) Notice: Subject to any disclaimer, the term of this patent is extended or adjusted under 35 U.S.C. 154(b) by 102 days.

(21) Appl. No.: 11/100,090

(22) Filed: Apr. 6, 2005

(65) Prior Publication Data

US 2006/0157599 A1 Jul. 20, 2006

Related U.S. Application Data

(60) Provisional application No. 60/651,254, filed on Feb. 9, 2005, provisional application No. 60/646,925, filed on Jan. 25, 2005.

(30) Foreign Application Priority Data

Jan. 17, 2005 (DE) .................. 10 2005 002 328
Feb. 4, 2005 (DE) .................. 10 2005 005 510

(51) Int. Cl.
*A47J 43/25* (2006.01)
(52) U.S. Cl. .................. 241/95; 241/273.1; 83/729; 83/856; 83/932
(58) Field of Classification Search .............. 83/355, 83/719, 729, 406.1, 856, 932; 241/92, 95, 241/273.1, 169, 169.1, 273.2–273.4, 168; 99/537; D7/678
See application file for complete search history.

(56) References Cited

U.S. PATENT DOCUMENTS

| | | | |
|---|---|---|---|
| 203,767 A * | 5/1878 | Pierson et al. | 241/84.4 |
| 447,655 A | 3/1891 | Bew et al. | |
| 557,914 A | 4/1896 | Struble | |
| 571,216 A * | 11/1896 | Damon | 137/614.04 |
| 582,326 A * | 5/1897 | Taylor et al. | 241/95 |
| 1,296,091 A | 3/1919 | Kriebel | |
| 1,865,411 A * | 6/1932 | Campbell | 83/729 |
| 1,987,910 A * | 1/1935 | Prickett | 241/283 |
| 2,766,793 A | 10/1956 | Duszynski et al. | |
| 2,786,503 A | 3/1957 | Lewis et al. | |

(Continued)

FOREIGN PATENT DOCUMENTS

DE 329251 C 11/1920

(Continued)

OTHER PUBLICATIONS

International Search Report for International No. PCT/EP2005/003567 mailed on Sep. 1, 2005.
U.S. Appl. No. 29/252,919, filed Jan. 30, 2006.

*Primary Examiner*—Mark Rosenbaum
(74) *Attorney, Agent, or Firm*—Leydig, Voit & Mayer, Ltd.

(57) ABSTRACT

A food holder for a grater or a slicer, having a shaft element into which food that is to be minced can be placed and through which it can be conveyed to a device for mincing foods that can be connected to the holder is characterized in that the shaft element has an elongated cross section.

22 Claims, 6 Drawing Sheets

U.S. PATENT DOCUMENTS

| | | | | |
|---|---|---|---|---|
| 2,807,302 A | * | 9/1957 | Qualheim | 83/444 |
| 2,991,814 A | * | 7/1961 | Popeil | 83/105 |
| 3,583,454 A | | 6/1971 | Borner et al. | |
| 4,038,892 A | | 8/1977 | Popeil | |
| D249,044 S | | 8/1978 | Popeil | |
| 4,310,971 A | * | 1/1982 | Rowell | 30/114 |
| 4,546,684 A | * | 10/1985 | Bellerose | 83/355 |
| 4,570,519 A | | 2/1986 | Motosko, II | |
| 4,572,443 A | * | 2/1986 | Coleman | 241/166 |
| 5,148,731 A | | 9/1992 | Boerner | |
| D337,706 S | * | 7/1993 | Shun | D7/678 |
| 5,308,002 A | * | 5/1994 | Pereira | 241/92 |
| D354,886 S | | 1/1995 | Diefenbach et al. | |
| D393,576 S | | 4/1998 | Wong et al. | |
| D393,986 S | | 5/1998 | Joergensen et al. | |
| 5,745,999 A | | 5/1998 | Zirkiev | |
| 6,082,645 A | | 7/2000 | Himmighofen et al. | |
| D446,691 S | | 8/2001 | Wong et al. | |
| D447,019 S | | 8/2001 | Wong et al. | |
| 6,412,717 B1 | * | 7/2002 | Menelaou | 241/92 |
| D495,218 S | | 8/2004 | Yu et al. | |
| D503,314 S | | 3/2005 | Wong | |
| 7,107,890 B2 | | 9/2006 | Vincent et al. | |
| D535,162 S | | 1/2007 | De Buyer et al. | |
| 2004/0200366 A1 | * | 10/2004 | Koerselman et al. | 99/537 |
| 2006/0075872 A1 | * | 4/2006 | Wangler | 83/856 |
| 2006/0231652 A1 | | 10/2006 | Menze | |
| 2006/0261196 A1 | | 11/2006 | Klotz et al. | |

FOREIGN PATENT DOCUMENTS

| | | |
|---|---|---|
| DE | 663782 | 8/1938 |
| DE | 844651 | 7/1952 |
| DE | 28 16 929 | 10/1979 |
| DE | 28 57 743 | 12/1982 |
| DE | 9201765 | 4/1992 |
| DE | 29914149 U1 | 12/1999 |
| DE | 20007264 U1 | 9/2000 |
| DE | 10305969 | 8/2004 |
| EP | 0412489 A2 | 2/1991 |
| EP | 0965418 | 12/1999 |
| FR | 597349 | 11/1925 |
| GB | 2032260 | 5/1980 |
| GB | 1599694 | 10/1981 |
| GB | 2313771 | 12/1997 |

* cited by examiner

HOLDER WITH SHAFT ELEMENT FOR A DEVICE FOR MINCING FOOD

CROSS REFERENCE TO PRIOR APPLICATIONS

This application claims benefit of German Patent Application Serial Nos. DE 10 2005 005 510.9 filed Feb. 4, 2005 and DE 10 2005 002 328.2 filed Jan. 17, 2005, as well as U.S. Provisional Application Ser. Nos. 60/651,254 filed Feb. 9, 2005 and 60/646,925 filed Jan. 25, 2005.

The invention relates to a food holder, having at least one placement element that defines a base plane and that is suitable for establishing a mechanical connection—for example a sliding, connection—to a device for mincing food—especially a grater or a slicer—and having a shaft element into which food that is to be minced can be placed and conveyed to a device for mincing food that can be connected to the holder.

BACKGROUND OF THE INVENTION

DE 28 16 929 describes a device for mincing food consisting of an elongated baseplate provided with a handle, over whose surface the food product to be minced can be moved back and forth by hand. In the middle section, the device has a replaceable mincing insert. DE 28 16 929 also describes a food remnant holder that, while holding the food product to be minced, can be moved back and forth on the baseplate.

DE 28 57 743 describes a food remnant holder for a device for mincing food. The food remnant holder has a tubular receptacle for the food product to be minced and a pusher with a hood that can be placed over the tubular receptacle.

The known holders have the drawback that the food product to be cut is not adequately guided during the cutting procedure, thus having a negative effect on the cutting results.

SUMMARY

Therefore, the invention is based on the objective of providing a holder with which the food product to be cut can be moved easily and precisely over a device for mincing food.

The present invention provides a food holder for a device for mincing food, such as a grater or a slicer, that has a shaft element operable to hold the food. The food is conveyed to the mincing device through the shaft element as the holder is moved over the mincing device along a travel axis. The shaft element has an elongated cross section.

BRIEF DESCRIPTION OF THE DRAWINGS

The subject matter of the invention is schematically depicted in the drawing and is described below with reference to the figures; elements with the same function are provided with the same reference numerals. The following is shown.

DETAILED DESCRIPTION

The holder according to the invention has the advantage that especially elongated food products to be cut such as, for example, carrots, can be moved easily and precisely over a device for mincing food such as a grater era slicer. Here, in an advantageous manner, elongated food products that are to be cut can be inserted obliquely into the shaft element along the elongated cross section, as a result of which said food product is especially securely held during the cutting procedure. Hence, it is also made possible to cut elongated food products obliquely—that is to say, at an angle that diverges sharply from 90 degrees relative to the longitudinal axis of the food product that is to be cut—for example, so as to create elongated slices.

In one embodiment, the shaft element has an oval cross section. In another variant, the shaft element has an elliptical cross section. The shaft element can advantageously also have a rectangular, triangular, rhombic or trapezoidal cross section. The shaft element can have a regular or else irregular polygonal cross section. In certain embodiments, the shaft element has at least one long opening width and one short opening width. There are also advantages to a shaft element with a triangular cross section. The triangle can advantageously be configured with unequal sides, as a result of which the food product to be cut is guided especially well in the holder.

In certain embodiments the shaft element has rounded-off corners in the inner area and/or in the outer area. This avoids tilting and jamming of the food product that is to be minced and simple cleaning of the holder is assured.

The holder may be mechanically coupled to a device for mincing food—especially a grater or a slicer—and at least one guide element may be provided that defines a travel axis. In one embodiment, the direction of the long opening width is at an angle relative to the travel axis that differs from zero degrees. This embodiment ensures that, during the cutting movement, the food product that is to be cut, in addition to making a movement on the cutting blade of a slicer, also makes a movement perpendicular to the blade of the cutting blade, as a result the cutting procedure is more comparable to cutting with a knife than to chopping with an ax. Last but not least, the shaft element that is positioned obliquely to the direction of movement accounts for a neater, more precise and smoother mincing procedure.

The direction of the long opening width may be at an angle to the travel axis that substantially differs from 90 degrees. In one embodiment, the shaft element has an oval and/or elliptical cross section. Also, in the projection on the base plane, the large longitudinal axis of the oval and/or elliptical cross section of the shaft is at an angle relative to the travel axis of the mincing movement that substantially differs from zero degrees. Due to this oblique position, the food product to be cut is guided especially neatly and securely over the cutting blade of a device for mincing food—especially a grater and/or a slicer.

In another embodiment, the shaft element is mounted so that it can rotate relative to the placement elements. In this manner, the holder can be adapted to the shape of the food product to be cut. This embodiment can be adapted especially well to different requirements when the type of food product to be minced is changed. A means for fixing a selected rotational position can be advantageously provided.

The holder may have a placement element that defines a base plane and that is suitable for establishing a mechanical connection—preferably a sliding connection to a device for mincing food—especially a grater or a slicer.

In yet another embodiment, the shaft element has an angle relative to the base plane that differs from 90 degrees, preferably an angle in the range of 30 to 60 degrees, especially 45 degrees. Particularly advantageous is a holder with which the angle of the shaft element relative to the base plane is adjustable. In this manner, the angle of the shaft element relative to the base plane can be adjusted individually to the slant of the grater being used. A shaft element that is arranged obliquely relative to the base plane has the advantage that the user only has to push in one direction, preferably along the perpendicular line, and at the same time, the food product to be cut is pressed into the holder and the holder is pushed over a device for mincing food. The force exerted by the user is automatically split into the requisite two forces. The user only has to press from the top downwards and is not required to exert horizontally oriented forces. As far as the horizontal movement is concerned, the hand of the user is guided by the holder, so to speak.

One or more sliding surfaces can serve as the placement element and they can lie, for example, on guide rails of a device for mincing food. The placement element can also have wheels, rollers, stop elements and/or guide elements. In some embodiments, the base plane is oriented parallel to the slide of the device for mincing food that is used together with the holder.

In one embodiment, the placement element has at least one guide element that can be mechanically coupled to guide elements of a device for mincing food—especially a grater and/or a slicer. The holder can be latched into a guide of a device for mincing food—especially a grater and/or a slicer—perpendicular to the travel axis of the mincing movement. In this manner, the awkward procedure of inserting the holder into the ends of the grater to be used can be avoided.

The holder and the device that is to be used for mincing food—especially a grater and/or a slicer—may be coordinated with each other in terms of their angle and/or guidance.

In some embodiments, at least one affixing means is provided with which the holder can be releasably affixed to a device for mincing food—especially a grater and/or a slicer. The affixing means can have at least parts of a latching mechanism and/or a hook connection. In this manner, the holder can easily be stowed together with the device for mincing food—especially a grater and/or a slicer.

Advantageously, the device for mincing food with which the holder is to be used can be adapted with respect to the especially advantageous features of the holder. Additionally, the holder and the device for mincing food can be manufactured as a complete system so as to be coordinated with each other.

The device for mincing food may have a slide on which a food product that is to be minced can be slid so as to carry out a mincing procedure. In one embodiment a stand means for setting up the device on a tabletop is provided, the slide having a set-up angle relative to the tabletop that differs from zero degrees. The shaft element can have an angle relative to the base plane and/or the slide that corresponds to the set-up angle (and/or to an angle of 90 degrees plus the set-up angle).

The shaft element may be arranged perpendicular to the horizontal plane since in this case, the user only has to exert a force perpendicular to the tabletop.

Figure 1:
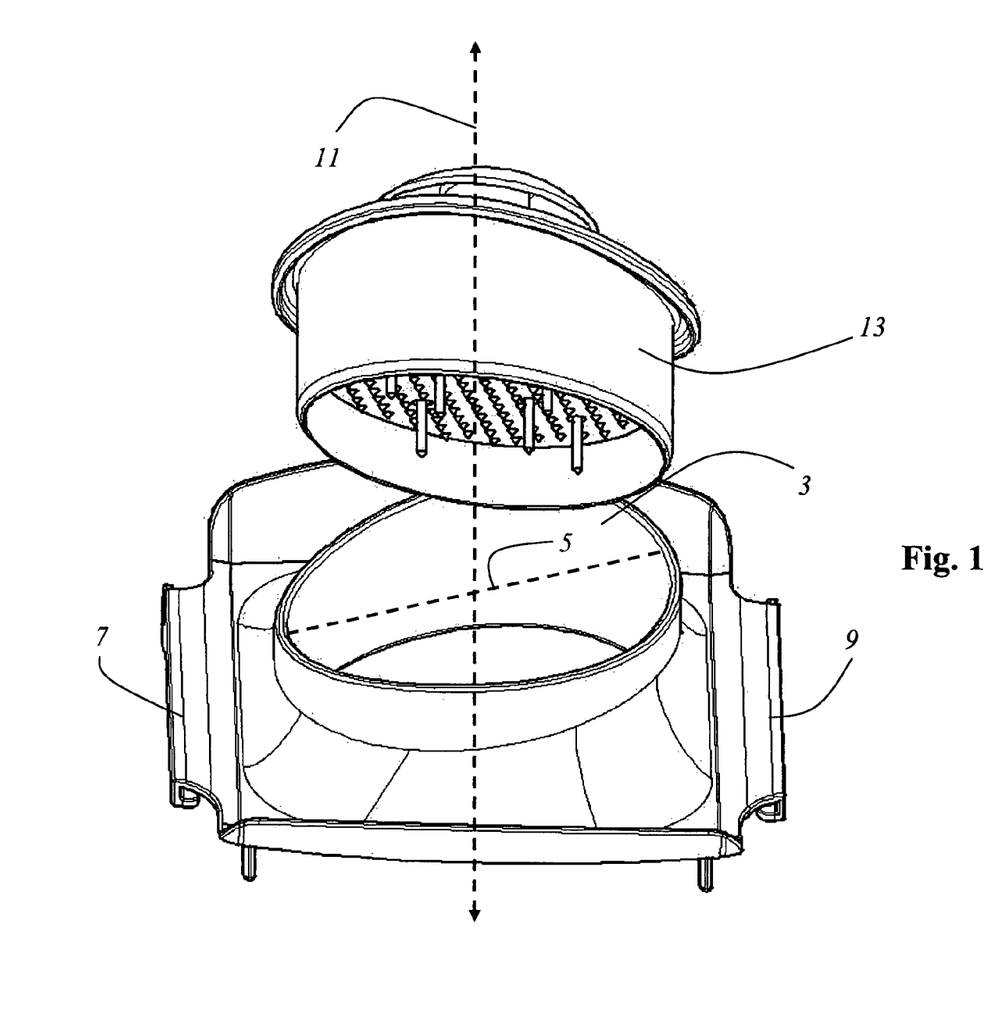
FIG. 1 a holder according to the invention.

FIG. 1 shows a food holder 1 according to the invention for a device for mincing food—for example a grater or a slicer—having a shaft element 3 into which food that is to be minced can be placed and through which it can be conveyed to a device for mincing food that is connected to the holder. The shaft element 3 has an elongated, oval cross section.

The shaft element 3 has a long opening width 5 and a short opening width. The holder can be mechanically coupled to a device for mincing food—especially a grater or a sheer—whereby a first guide element 7 and a second guide element 9, which define a travel axis, 11 are provided. The guide elements 7, 9 are provided in order to engage into guide rails of a device for mincing food—for example a grater or a slicer—and they can be slid on the guide rail together with the holder.

Figure 3:
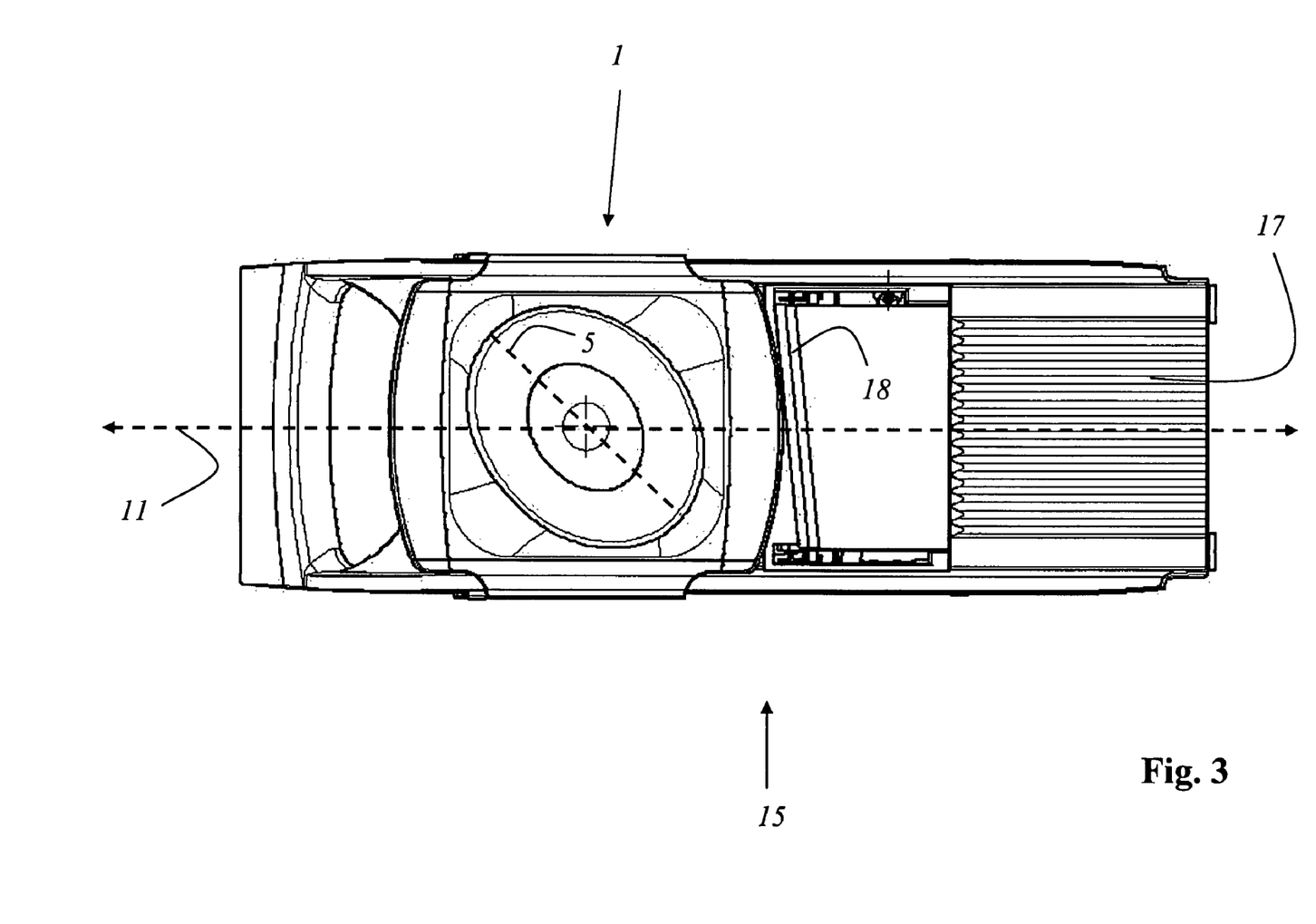
FIG. 3 a device for mincing food, with a mounted holder according to the invention, FIG. 4 a device for mincing food, with a holder and a stand means, FIG. 5 a detailed view of a holder according to the invention, and FIG. 6 a device for mincing food, with a stand means and another holder according to the invention.

The direction of the long opening width 5 is at a slanted angle relative to the travel axis (that substantially differs from zero degrees and 90 degrees, as shown in FIG. 3).

Figure 2:
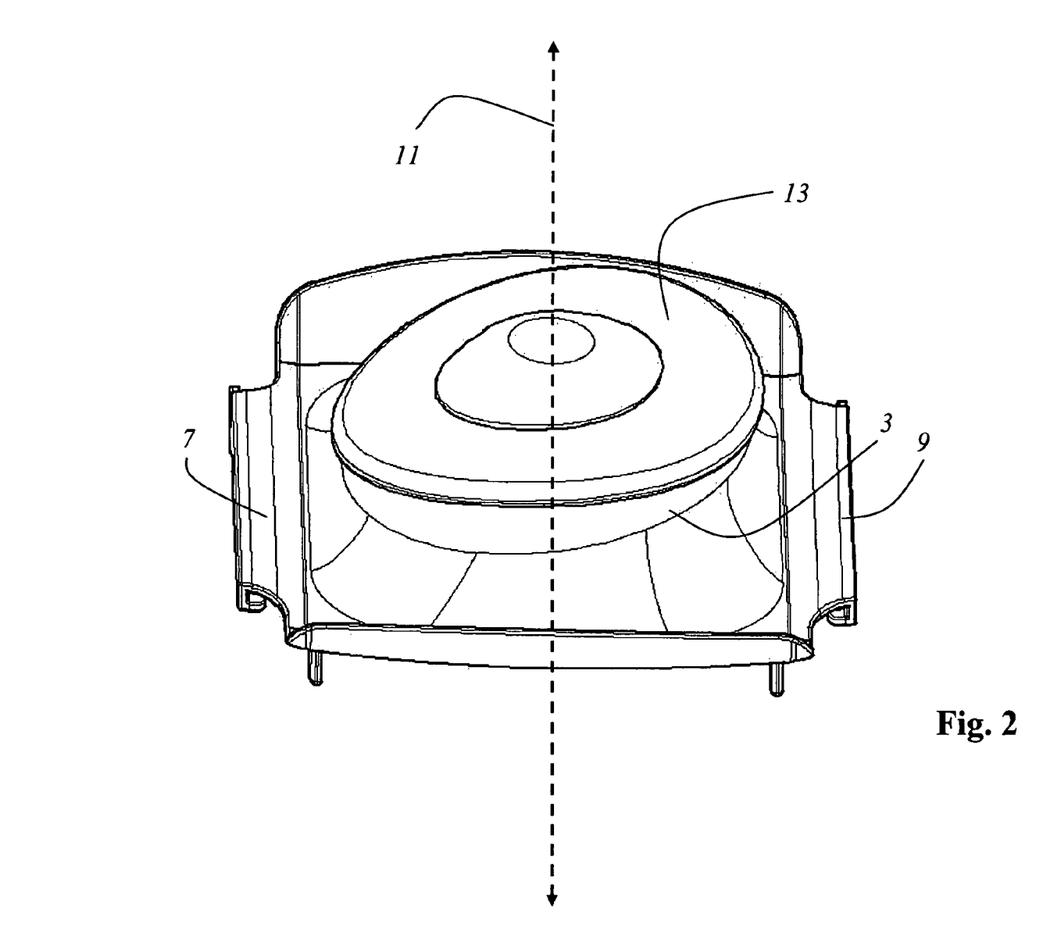
FIG. 2 the holder according to the invention, with an inserted pusher.

A pusher 13 is provided that can be inserted into the shaft element 3. The outer shape of the pusher 13 matches the inner shape of the shaft element 3. FIG. 2 shows the holder according to the invention, with the pusher 13 inserted into place.

FIG. 3 shows a device with a mounted holder 1 according to the invention and with a slide 17 on which a food product that is to be minced can be slid so as to carry out a mincing procedure. The device 15 for mincing food is fitted with a cutting blade 18. The holder 5 can be moved back and forth along the travel axis 11 on the device 15 for mincing food, whereby a food product to be minced can be moved over the cutting blade 18.

Figure 4:
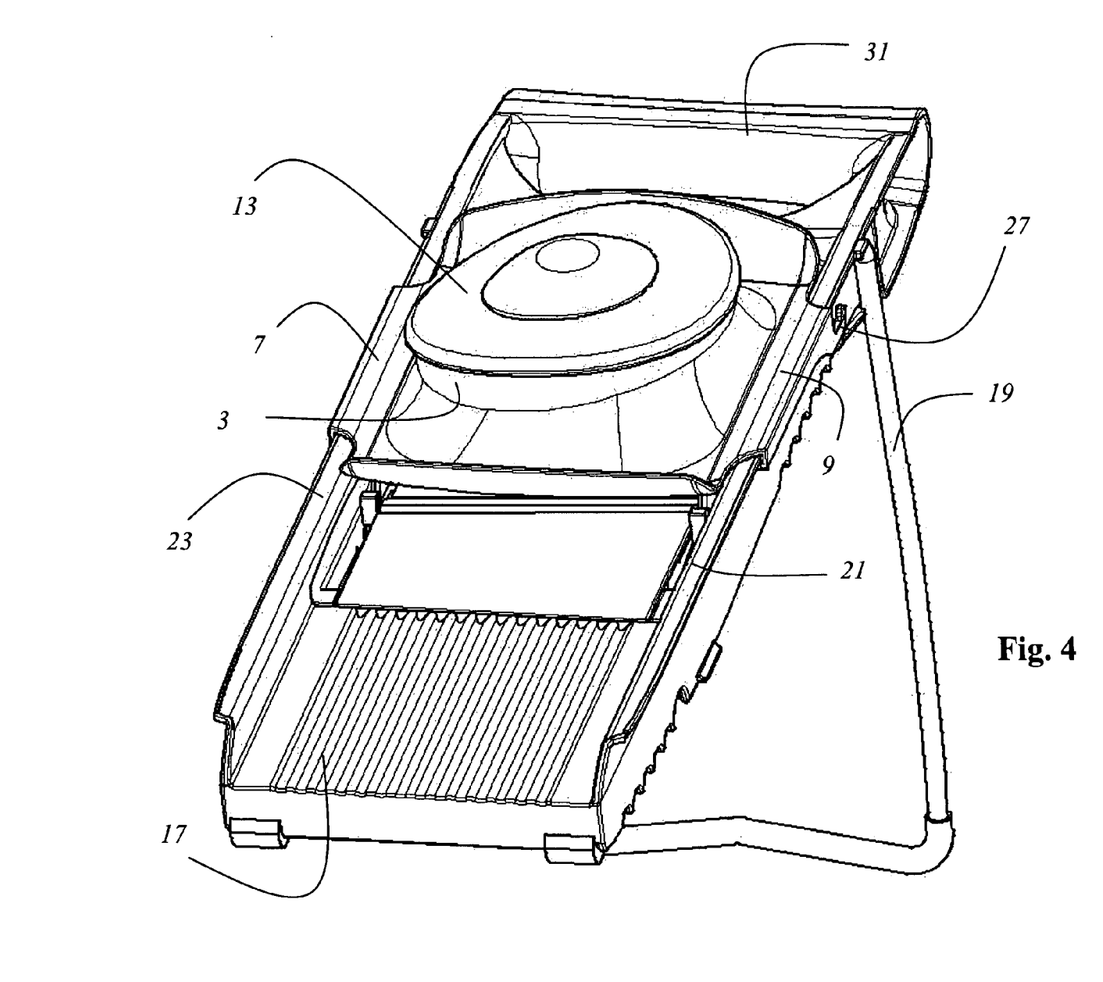

The device 15 for mincing food shown in FIG. 4 has a stand 19 so that the device can be set up on a tabletop. Moreover, guide rails 21, 23 are provided that, with the guide elements 7, 9 of the holder 5, hold the holder 5 on the slide 17 and ensure that the holder can be moved neatly and precisely along the travel axis 11.

Figure 5:
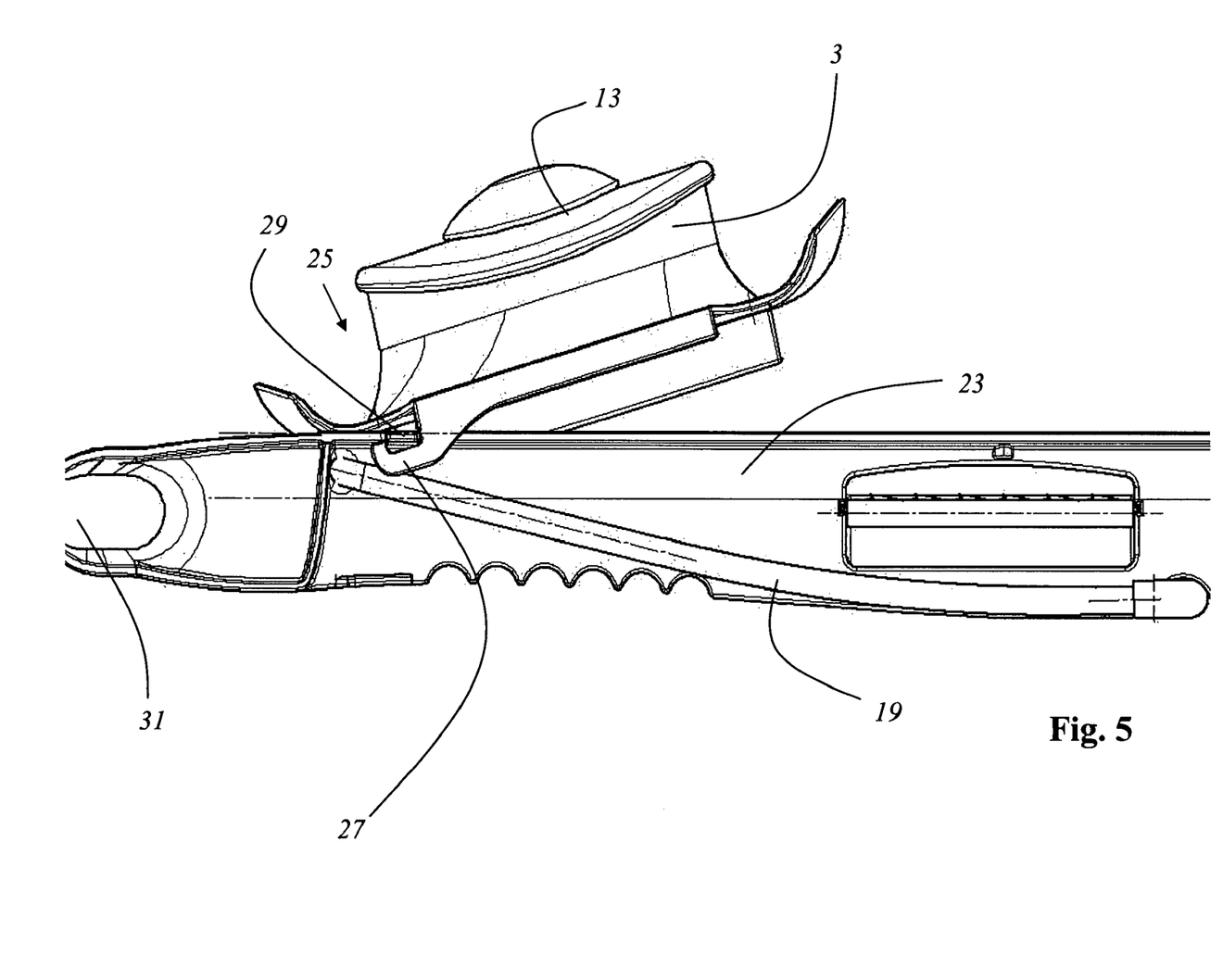

FIG. 5 shows an affixing means 25 with which the holder 1 can be releasably affixed to the device 15 for mincing food. The affixing means 25 is configured as a hook connection and comprises a hook 27 on the holder 1 and a pin 29 on the device 15 for mincing food. In this manner, the holder can easily be stowed together with the device 15 for mincing food. The device 15 for mincing food has a handle 31. In the device shown in this figure, the stand 19 has been folded in.

Figure 6:
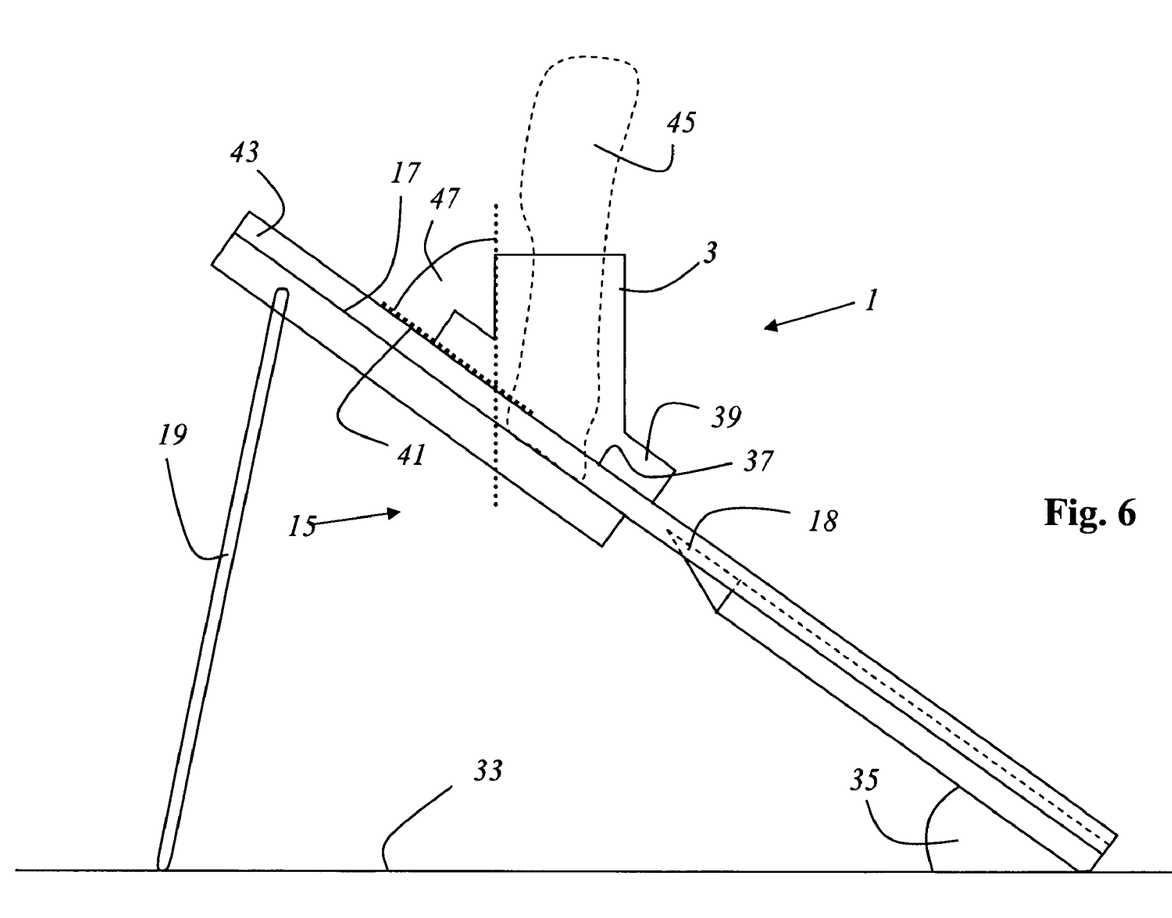

The device 15 for mincing food shown in FIG. 6 has a stand 19 so that the device 15 can be set up on a tabletop 33 at a set-up angle 35. On the device 15 for mincing food, there is a holder 1 with a placement element 39 having a sliding surface 37 that defines a base plane 41 and that serves to establish a mechanical sliding connection to the device 15 for mincing food. The device 15 for mincing food is fitted with sliding guide rails 43 on which the sliding surfaces 37 slide during the cutting movement (back-and-forth movement). The holder 1 has a shaft element 3 with a through axis into which the food product 45 to be minced can be placed and conveyed to the device 15 for mincing food. The shaft element 3, particularly with respect to the through axis, has an angle 47 relative to the base plane 41 that differs from 90 degrees, namely, an angle that corresponds to the set-up angle 35. In order to carry out the cutting movement, there is only a need to exert a downwards force on the food product 45 that is to be minced.

The invention has been described with reference to a specific embodiment. However, it goes without saying that changes and modifications can be made without departing from the protective scope of the claims below.

LIST OF REFERENCE NUMERALS 1 holder
3 shaft element
5 long opening width
7 first guide element
9 second guide element
11 travel axis 13 pusher
15 device for mincing food
17 slide
18 cutting blade
19 stand
21 guide rail
23 guide rail
25 affixing means
27 hook
29 pin
31 handle
33 tabletop
35 set-up angle
37 sliding surface
39 placement element
41 base plane
43 sliding guide rail
45 sliding guide rail
47 angle relative to the base plane 41

The invention claimed is:

1. A food holder for a food mincing device including at least one of a grater and a slicer, the food holder comprising a shaft element operable to hold food to be minced,
wherein the shaft element is operable to convey food therethrough to the food mincing device as the shaft element is moved over the food mincing device along a travel axis,
wherein the shaft element has a through axis and an elongated cross section,
wherein an angle of the through axis of the shaft element relative to the travel axis is adjustable, and
wherein the shaft element includes a long opening width and a short opening width, the long opening width being at an angle relative to the travel axis that substantially differs from zero degrees and ninety degrees.

2. The food holder according to claim 1, wherein the shaft element has an oval cross section.

3. The food holder according to claim 1, wherein the shaft element has an elliptical cross section.

4. The food holder according to claim 1, wherein the shaft element has a rectangular or triangular cross section.

5. The food holder according to claim 1, wherein the shaft element has a rhombic or trapezoidal cross section.

6. The food holder according to claim 1, wherein the shaft element has a polygonal cross section.

7. The food holder according to claim 1, wherein the shaft element has rounded-off corners in a cross section thereof.

8. The food holder according to claim 1, wherein the shaft element is operable to be mechanically coupled to the food mincing device, and further comprising at least one guide element defining the travel axis.

9. The food holder according to claim 1, wherein the food holder is latchable into a guide of the food mincing device in a direction perpendicular to the travel axis.

10. The food holder according to claim 1, further comprising a placement element that defines a base plane and that is operable to establish a sliding connection with the food mincing device.

11. The food holder according to claim 10, wherein the shaft element is rotatably mounted relative to the placement element.

12. The holder according to claim 11, further comprising a fixing device configured to fix a selected rotational position of the shaft element.

13. The food holder according to claim 10, wherein the shaft element has an angle relative to the base plane in a range of 30 to 60 degrees.

14. The food holder according to claim 1 further comprising at least one affixing device configured to releasably affix the food holder to the food mincing device.

15. The food holder according to claim 14, wherein the at least one affixing device includes at least part of at least one of a latching mechanism and hook connection.

16. A device comprising:
at least one of a food grater and a food slicer; and
a holder including an annular shaft element with a through axis and an elongated cross section, and a placement element operable to establish a sliding connection with the at least one of a food grater and a food slicer,
wherein the placement element defines a base plane,
wherein the shaft element is operable to hold food and convey the food therethrough to the at least one of a food grater and a food slicer as the holder is moved over the at least one of a grater and slicer along a travel axis,
wherein the elongated cross section of the annular shaft element includes a long opening width and a short opening width, the long opening width being at an angle relative to the travel axis that substantially differs from zero and 90 degrees, and
wherein an angle of the through axis of the shaft element relative to the base plane substantially differs from 90 degrees.

17. The device according to claim 16, wherein the device has a slide on which the food that is to be minced can be slid so as to carry out a mincing procedure.

18. The device according to claim 17, wherein the food mincing device includes a stand for setting up the device on a tabletop, the slide having a set-up angle relative to the tabletop that differs from zero degrees.

19. The device according to claim 18, wherein the shaft element has an angle relative to one of the base plane and slide that corresponds to the set-up angle.

20. The device according to claim 16, wherein the shaft element has an angle relative to the base plane in a range of 30 to 60 degrees.

21. An apparatus for mincing food comprising
a mincing device including at least one of a grater and a slicer and defining a travel axis along which the food is movable; and
a holder including a shaft element operable to hold the food and convey it therethrough to the mincing device and to move the food along the travel axis, the shaft element including a through axis and an elongated cross section having a long opening width and a short opening width, the long opening width being at an angle relative to the travel axis that substantially differs from zero and 90 degrees,
wherein an angle of the through axis of the shaft element relative to the travel axis is adjustable.

22. The apparatus according to claim 21 wherein:
the holder includes a placement element defining a base plane and operable to establish a sliding connection with the mincing device; and
the shaft element has an angle relative to the base plane in a range of 30 to 60 degrees.

* * * * *